United States Patent [19]

Lesiak

[11] 4,097,839

[45] Jun. 27, 1978

[54] WINDSHIELD WIPER SYSTEM ACTIVATED LIGHTING

[76] Inventor: Walter J. Lesiak, 112 Old Tavern La., Summerville, S.C. 29483

[21] Appl. No.: 674,966

[22] Filed: Apr. 8, 1976

[51] Int. Cl.² .......................... B60Q 1/08; B60Q 1/20
[52] U.S. Cl. .............................. 340/52 R; 340/52 D; 315/82; 307/10 LS
[58] Field of Search ................. 340/52 R, 52 D, 52 F, 340/53, 235; 307/116, 118, 132 EA, 10 LS; 200/61.04, 61.05; 318/483; 315/77, 82, 83

[56] References Cited

U.S. PATENT DOCUMENTS

| | | | |
|---|---|---|---|
| 2,640,958 | 6/1953 | Davis | 340/235 X |
| 2,731,588 | 1/1956 | McLeod | 318/483 |
| 3,555,289 | 1/1971 | Sobkow | 307/118 X |
| 3,649,898 | 3/1972 | Inoue | 318/483 |
| 3,749,885 | 7/1973 | Nagasima | 340/235 X |
| 3,767,966 | 10/1973 | Bell | 315/83 |
| 3,909,619 | 9/1975 | Kniesly et al. | 307/10 LS |
| 4,009,363 | 2/1977 | Binegar | 307/10 LS X |
| 4,010,380 | 3/1977 | Bailer et al. | 307/10 LS |

*Primary Examiner*—Alvin H. Waring
*Attorney, Agent, or Firm*—Harry Harold Kline

[57] ABSTRACT

A circuitry for use in activating pre-determined light means upon the activation of the windshield wiper system of a vehicle.

8 Claims, 3 Drawing Figures

WINDSHIELD WIPER SYSTEM ACTIVATED LIGHTING

This invention relates to a vehicle lighting system and more particularly to a vehicle lighting system which may be activated whenever the vehicle's windshield wiper system is being operated.

Adverse weather conditions such as rain, sleet, snow, fog, and smog may necessitate activation of the vehicle's windshield wiper system for improved visibility. The windshield wiper system alone, however, may not be sufficient to improve the visibility of the vehicle operator adequately. The windshield wiper system also does not improve the vehicle's visibility to other vehicle operators under these adverse conditions. Therefore, activating the exterior lighting system of the vehicle may be a necessity for proper visibility. The present invention insures that whenever adverse weather conditions require the use of windshield wipers, a pre-designated portion of the vehicle's exterior lighting system will be activated.

An object of the present invention is to insure that whenever adverse conditions require the activation of windshield wipers, the vehicle's exterior lighting system will also be activated.

A further object of this invention is to provide interior warning devices to notify the vehicle operator that the lighting system has been activated.

Still another object of this invention is to automatically illuminate the vehicle's head lamps and tail lamps whenever the vehicle's windshield wiper system is activated.

A further object of this invention is to warn the vehicle operator that the windshield wiper system is activated and that the head lamps need to be turned on manually in a system that is not automatic.

Still another object of this invention is to install independent fog lights on a vehicle for use under adverse conditions when the windshield wiper system is required.

These and other objects and features of the invention will be apparent from the following description and appended claims.

Briefly, circuits are disclosed for activating predetermined light means upon the activation of the windshield wiper system of a vehicle. The circuits comprise power means operative to provide power within the vehicle, switch means operative to activate the windshield wiper system, and activating means operative to activate the predetermined light means. The switch means is connected to the power means. The activating means is responsive to the switch means. The circuit may further comprise warning means operative to alert the operator of the vehicle that the switch means has activated the windshield wiper system. The warning means may be a warning light or a buzzer. This circuit may further comprise relay means operative to deactivate the warning means when the actuating means has activated the predetermined light means. The activating means may be a manual light switch or an automatic system. The activating means may comprise a first relay means connected to the switch means and a second relay means connected to the power means and the predetermined light means. When the switch means activates the windshield wiper system, the first relay means causes the second relay means to provide power from the power means to activate the predetermined light means. The circuit may comprise a notification means connected to, and provided power from said power means through, said first relay means. The notification means is operative to notify the operator of the vehicle that the predetermined light means have been activated. The circuit may further comprise a light switch which is manually operated. The light switch may provide power directly to the predetermined light means and cause the first relay means to prevent power from reaching the notification means, thereby deactivating the notification means. A diode means may be connected to the light switch, first relay means, and second relay means. The diode means is operative to allow current flow from the light switch, when activated, to the predetermined light means. The diode prevents current flow toward the light switch when power is provided through the second relay means to the predetermined light means. The activating means may comprise a relay means connected to the switch means and operative to provide power directly to the predetermined light means when the switch means activates the windshield wiper system. The predetermined light means may comprise fog lights attached to the vehicle and the rear parking lights of the vehicle. A fog light switch may manually activate the fog lights without activation of the windshield wiper system. A warning light may be connected to the fog light switch in order to notify the operator of the vehicle that the fog lights are activated. The power means may be a vehicle battery. The activating means in the present invention may be a manual or automatic system. The activating means is responsive to the switch means and is operative to activate the predetermined light means. Various modifications of the circuitry shown are anticipated by those who are skilled in the art. Various adaptations of this invention, in order to use present electrical wiring systems that are available or installed in vehicles, are anticipated by this invention. Many different circuits may be conceived which will perform the intent and purposes of the present invention, and all of them are within the scope of this invention.

The invention will be more fully understood from the following detailed description and appended claims when taken with the drawings in which:

Figure 1:
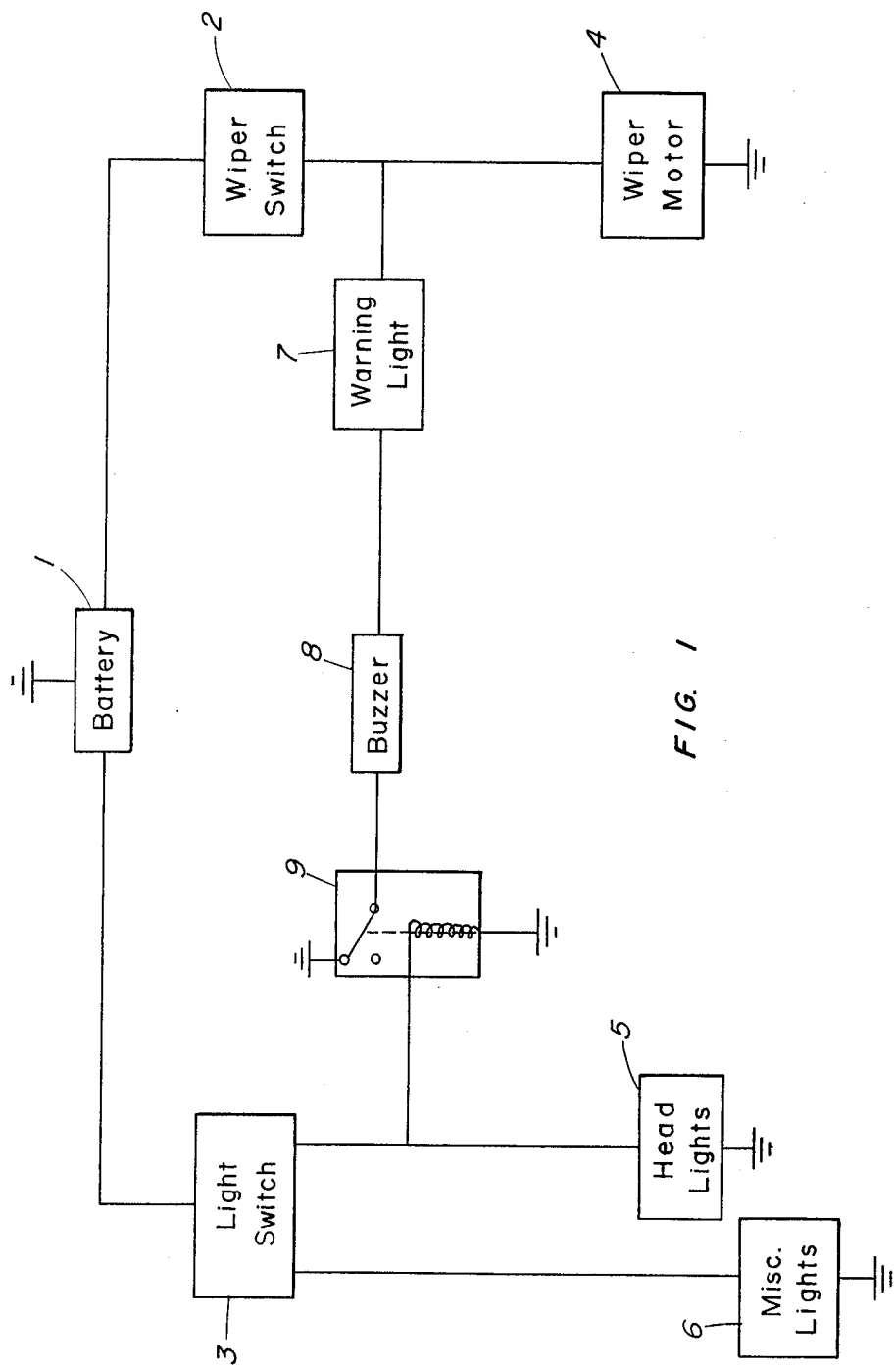
FIG. 1 is a black box circuit diagram of a system for manually activating a vehicle's lights when the vehicle's windshield wiper switch is activated.

Referring now to the drawings, FIG. 1 is a black box circuit diagram of a system for manually activating a vehicle's lights when the vehicle's windshield wiper switch is activated. FIG. 1 shows vehicle battery 1 connected to ground, and to light switch 3 and wiper switch 2. Wiper switch 2 is connected to wiper motor 4, warning light 7 and battery 1. Wiper motor 4 is connected to warning light 7, wiper switch 2 and to ground. Buzzer 8 is connected to warning light 7 and relay means 9. Relay means 9 is connected to buzzer 8, light switch 3, and head lights 5. Light switch 3 is connected to battery 1, miscellaneous lights 6, head lights 5, and relay means 9. Miscellaneous lights 6 is connected to light switch 3 and to ground. Head lights 5 is connected to light switch 3, relay means 9, and ground. Warning light 7 is connected to buzzer 8, wiper switch 2, and wiper motor 4.

When wiper switch 2 is activated, wiper motor 4 is connected to battery 1 to complete the circuit for activating the windshield wiper system. Warning light 7 is also connected through closed wiper switch 2 to battery 1 and warning light 7 illuminates. In this manual system, the warning light may say "turn head lights on", or some other desired message, in order to notify the vehicle operator that the windshield wiper system is operating and that the head lights need to be activated.

When wiper switch 2 is closed, the circuit is complete through battery 1, wiper switch 2, warning light 7, buzzer 8, and relay means 9, and back to ground. Buzzer 8 is activated and sounds an alarm to further notify the vehicle operator that the vehicle's lights need to be activated. This system may use either warning light 7 or buzzer 8, or both, or some other warning-type device which is activated by the closing of the wiper switch 2.

When the light switch 3 is closed, battery 1 is connected to miscellaneous lights 6 and head lights 5, thereby activating those lights. Current flows from battery 1 through light switch 3 and through relay means 9 to ground. This causes the circuit containing warning devices, warning light 7 and buzzer 8, to open, thereby de-activating these warning devices.

Figure 2:
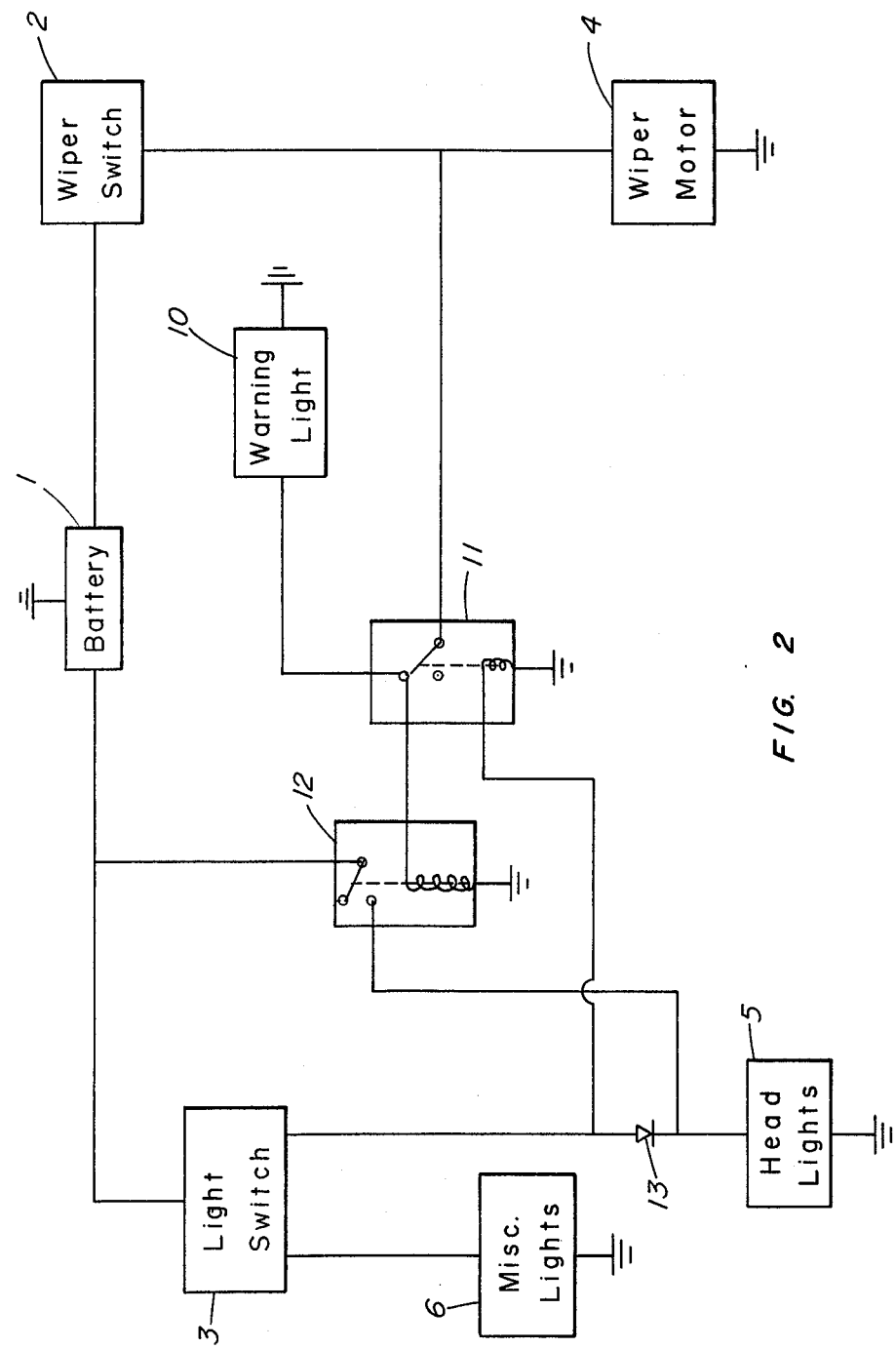
FIG. 2 is a black box circuit diagram of a system which automatically illuminates a vehicle's exterior lights when the vehicle's windshield wiper is activated.

FIG. 2 is a black box circuit diagram of a system which automatically illuminates a vehicle's exterior lights when the vehicle's windshield wiper system is activated. In FIG. 2, battery 1 is connected to wiper switch 2 and light switch 3. Wiper switch 2 is connected to wiper motor 4 and relay means 11. Wiper motor 4 is connected to wiper switch 2, relay means 11, and to ground. Relay means 11 is connected to wiper motor 4, wiper switch 2, warning light 10, relay means 12, light switch 3, diode 13, and to ground. Warning light 10 is connected to ground, and to relay means 11. Relay means 12 is connected to battery 1, light switch 3, relay means 11, head lights 5, diode 13, and ground. Light switch 3 is connected to battery 1, relay means 12, miscellaneous lights 6, diode 13, and relay means 11. Miscellaneous lights 6 are connected to light switch 3 and to ground. Head lights 5 are connected to diode 13, relay means 12, and to ground. Diode 13 is connected to light switch 3, relay means 11, and relay means 12.

When wiper switch 2 is activated, a circuit is completed between ground, battery 1, wiper switch 2, wiper motor 4, and back to ground in order to activate the windshield wiper system. When the windshield wiper system is activated, current also flows between ground, battery 1, wiper switch 2, and through relay means 11. Current wil flow through relay means 11, through warning light 10 to ground, thereby activating warning light 10. This light may inform the operator of the condition "head lights on automatically", which indicates that the head lights have been automatically activated. Current also flows from relay means 11 through the coil in relay means 12 to ground. This causes relay means 12 to close and complete the circuit between battery 1 and head lights 5, thereby activating the vehicle's exterior lighting system automatically. Diode 13 prevents current from flowing back into light switch 3 or relay means 11. When the vehicle operator realizes that the head lights are on, and wishes to normalize the system by closing light switch 3, then the circuit is connected through battery 1, light switch 3, diode 13, and head lights 5 in order to continue the activation of the vehicle's exterior lights. At this time, current will also flow from battery 1, through light switch 3, through the coil in relay means 11, thereby opening the previous circuit which passed through relay means 11. No current will flow then to warning light 10 and it will be de-activated. No current will then flow through the coil in relay means 12 and the circuit which previoiusly brought current to the head lights 5 will be opened.

Figure 3:
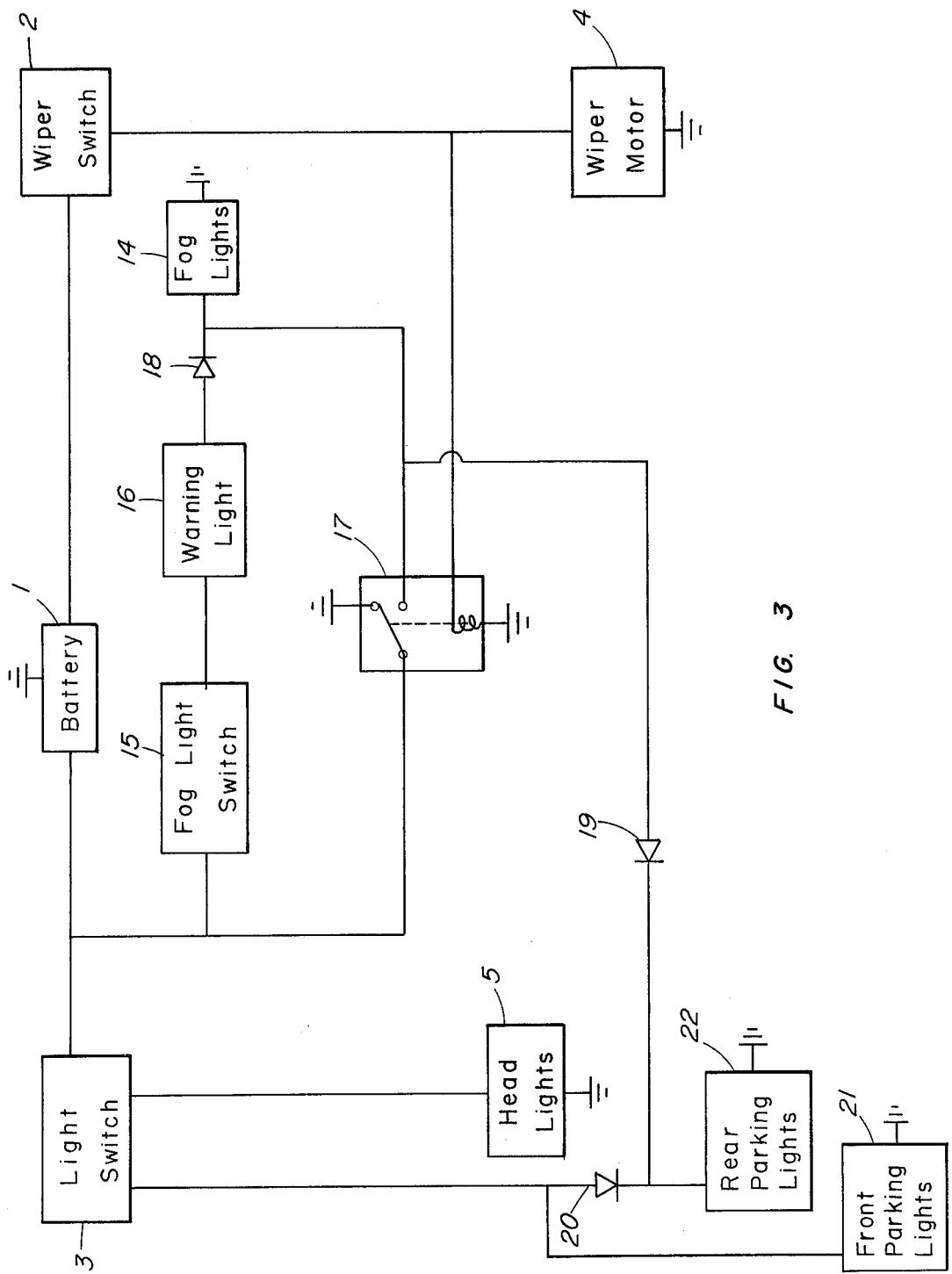
FIG. 3 is a black box circuit diagram of a system which will automatically illuminate fog lights and other specified vehicle lights when the windshield wiper system is activated.

FIG. 3 is a black box circuit diagram of a system which will automatically illuminate fog lights and other specified vehicle lights when the windshield wiper system is activated. Battery 1 is connected to light switch 3, fog light switch 15, relay means 17, wiper switch 2, and to ground. Wiper switch 2 is connected to battery 1, wiper motor 4, and the coil of relay means 17. Wiper motor 4 is connected to wiper switch 2, the coil of relay means 17, and to ground. Relay means 17 is connected to fog light switch 15, battery 1, light switch 3, fog lights 14, diode 18, wiper switch 2, wiper motor 4, and to ground. Fog light switch 15 is connected to relay means 17, light switch 3, battery 1, and warning light 16. Warning light 16 is connected to fog light switch 15, and diode 18. Diode 18 is connected to warning light 16, relay means 17, and fog lights 14. Fog lights 14 are connected to diode 18, relay means 17, and to ground. Light switch 3 is connected to battery 1, fog light switch 15, relay means 17, head lights 5, diode 20, and front parking lights 21. Head lights 5 are connected to light switch 3 and to ground. Rear parking lights 22 are connected to diode 20, diode 19, and to ground. Front parking lights 21 are connected to light switch 3, diode 20, and to ground. Diode 20 is connected to light switch 3, front parking lights 21, rear parking lights 22, and diode 19. Diode 19 is connected to diode 20, rear parking lights 22, relay means 17, diode 18, and fog lights 14.

When wiper switch 2 is closed, current flows from ground through battery 1, wiper switch 2, and wiper motor 4, back to ground to complete the circuit and activate the windshield wiper system. Current also flows from ground through battery 1, wiper switch 2, through the coil of relay means 17, to ground. Relay means 17 is thereby closed causing current to flow from battery 1, through relay means 17, to fog lights 14, in order to automatically illuminate the fog lights 14 when the windshield wiper system is activated. The fog light switch 15 may be closed in order to connect the battery 1 through warning light 16, and diode 18 to the fog lights 14 so that the fog lights 14 may be activated at any tme, even though the windshield wiper system is not operating. When relay means 17 is closed, current will also flow from battery 1 through relay means 17, through diode 19, and through rear parking lights 22 to ground. This will activate the rear parking lights 22. Warning light 16 may inform the vehicle operator that the fog lights are manually activated through the fog light switch 15. The head lights 5 are activated directly by light switch 3 which also activates front parking lights 21 and rear parking lights 22. This system illuminates the fog lights 14 and the rear parking lights 22 automatically when the windshield wiper system is activated.

In any of the circits shown in FIG. 1, FIG. 2 and FIG. 3, various lights may be placed in the various black boxes. Any combination of lights may be manually or automatically activated when the windshield wiper system is activated.

FIG. 3 illustrates an example of a system which automatically activates independent fog lights. These lights may be silver iodine fog lamps mounted on the front of the vehicle; however, any desired lamps or lights may be used.

One relay which may operate in the circuits described is Ford Motor Company Trailer Exterior Lamp Relay No. D-3SZ-13A435-A.

The power means for the circuitry in FIG. 1, FIG. 2 and FIG. 3 may be battery 1, or any other power means desirable and useable. Wiper switch 2 is the switch means which is operative to activate the windshield wiper system. The activating means may be manual or automatic as long as the activating means is operative to activate whatever pre-determined light means is desired, when the switch means, wiper switch 2, activates the windshield wiper system.

Warning means may be a light, a buzzer, or any other device useful for the desired purposes. Any amount of lighting can be activated by the circuitry shown. In FIG. 1, any desired lighting can be connected within the black box labeled head lights 5. In FIG. 2, any desired lighting can be wired into the black box labeled head lights 5. In FIG. 3, any desired pre-determined lighting can be wired into the black box labeled fog lights 14. In FIG. 2, relay means 11 is a first relay means which causes power to flow through second relay means, relay means 12. Warning light 10 is a notification means which notifies the operator of the vehicle that the pre-determined light means, head lights 5, have been activated.

The diodes shown may be any circuit elements which perform the basic functions of a diode.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

I claim:

1. A circuit for activating a pre-determined light means upon the activation of the windshield wiper system of a vehicle comprising:
    (a) power means operative to provide power within said vehicle;
    (b) switch means connected to said power means and operative to activate said windshield wiper system;
    (c) activating means operative to activate said pre-determined light means;
    (d) said pre-determined light means comprising exterior lighting on said vehicle; and
    (e) said activating means comprising first relay means connected to said switch means and second relay connected to said power means and said pre-determined light means;

whereby when said switch means activates said windshield wiper system, said first relay means causes said second relay means to provide power from said power means to actiate said pre-determined light means.

2. A circuit according to claim 1 further comprising a notification means connected to, and provided power from said power means through, said first relay means and operative, when activated, to notify the operator of said vehicle that said predetermined light means has been activated automatically.

3. A circuit according to claim 2 further comprising a light switch manually operated and operative, when activated, to provide power directly from said power means to said predetermined light means and to cause said first relay means to prevent power from said power means from reaching said notification means, thereby de-activating said notification means.

4. A circuit according to claim 3 further comprising diode means connected to said light switch, said first relay means, and said second relay means; and operative to allow current flow from said light switch, when activated, to said pre-determined light means and to prevent current flow toward said light switch when power from said power means is provided through said second relay means to said pre-determined light means.

5. A circuit according to claim 1 wherein said pre-determined light means comprises fog lights attached to said vehicle and the rear parking lights of said vehicle.

6. A circuit according to claim 5 further comprising a fog light switch operative to manually activate said fog lights without activation of said windshield wiper system.

7. A circuit according to claim 6 further comprising a warning light connected to said fog light switch and operative to notify said operator of said vehicle that said fog lights are activated.

8. A circuit according to claim 1 wherein said power means is a vehicle battery.

* * * * *